(12) United States Patent
Gurikar et al.

(10) Patent No.: US 8,997,088 B2
(45) Date of Patent: Mar. 31, 2015

(54) METHODS AND SYSTEMS FOR AUTOMATED DEPLOYMENT OF SOFTWARE APPLICATIONS ON HETEROGENEOUS CLOUD ENVIRONMENTS

(71) Applicants: Nagesh Nagaraj Gurikar, Bangalore (IN); John Jesudason Doss, Bangalore (IN); Sudipta Ghosh, Kolkata (IN); Magesh Kasthuri, Little Kanchipuram (IN)

(72) Inventors: Nagesh Nagaraj Gurikar, Bangalore (IN); John Jesudason Doss, Bangalore (IN); Sudipta Ghosh, Kolkata (IN); Magesh Kasthuri, Little Kanchipuram (IN)

(73) Assignee: Wipro Limited (IN)

( * ) Notice: Subject to any disclaimer, the term of this patent is extended or adjusted under 35 U.S.C. 154(b) by 115 days.

(21) Appl. No.: 13/755,042

(22) Filed: Jan. 31, 2013

(65) Prior Publication Data
US 2014/0130036 A1    May 8, 2014

(30) Foreign Application Priority Data
Nov. 2, 2012    (IN) ............................ 4599/CHE/2012

(51) Int. Cl.
*G06F 9/455*    (2006.01)
*G06F 9/445*    (2006.01)

(52) U.S. Cl.
CPC .. *G06F 8/61* (2013.01); *G06F 8/62* (2013.01); *G06F 8/60* (2013.01)
USPC ........... 717/173; 717/168; 717/169; 717/170; 717/174; 717/175

(58) Field of Classification Search
None
See application file for complete search history.

(56) References Cited

U.S. PATENT DOCUMENTS

| | | | | |
|---|---|---|---|---|
| 7,089,552 | B2 * | 8/2006 | Atallah | 717/175 |
| 7,503,031 | B2 * | 3/2009 | Chang et al. | 717/101 |
| 7,926,051 | B2 * | 4/2011 | Barta et al. | 717/174 |
| 7,971,047 | B1 * | 6/2011 | Vlaovic et al. | 713/1 |
| 8,239,509 | B2 * | 8/2012 | Ferris et al. | 709/223 |
| 8,434,080 | B2 * | 4/2013 | Yendluri | 717/177 |
| 8,438,559 | B2 * | 5/2013 | Naslavsky et al. | 717/174 |

(Continued)

OTHER PUBLICATIONS

Leymann, F. et al., "Moving Applications to the Cloud: An Approach Based on Application Model Enrichment," International Journal of Cooperative Information Systems, vol. 20, No. 3 (2011) 307-356.

(Continued)

*Primary Examiner* — Isaac T Tecklu
(74) *Attorney, Agent, or Firm* — Finnegan, Henderson, Farabow, Garrett & Dunner LLP

(57) ABSTRACT

A method and system of deploying at least one software application from at least one source platform to at least one target platform is provided. The method may include obtaining configuration data on interdependency between the at least one target platform and the at least one software application. The method may further include checking a readiness of the at least one source platform for initiating deployment of the at least one software application. The method may further include checking a readiness of the at least one target platform for initiating deployment of the at least one software application and performing a selective deployment of the at least one software application after the readiness check. The method may further include performing a post-deployment assessment of the selectively deployed at least one software application after the selective deployment, wherein the post-deployment assessment includes checking a status parameter of the selectively deployed at least one software application.

22 Claims, 8 Drawing Sheets

(56) References Cited

U.S. PATENT DOCUMENTS

| | | | |
|---|---|---|---|
| 8,732,668 B2* | 5/2014 | Klemenz et al. | 717/125 |
| 8,769,340 B2* | 7/2014 | Li et al. | 714/33 |
| 2002/0124245 A1* | 9/2002 | Maddux et al. | 717/176 |
| 2003/0051236 A1* | 3/2003 | Pace et al. | 717/177 |
| 2004/0194055 A1* | 9/2004 | Galloway et al. | 717/101 |
| 2005/0188345 A1* | 8/2005 | Chang et al. | 717/101 |
| 2007/0240102 A1* | 10/2007 | Bello et al. | 717/104 |
| 2009/0249284 A1* | 10/2009 | Antosz et al. | 717/104 |
| 2009/0300607 A1* | 12/2009 | Ferris et al. | 718/1 |
| 2009/0300641 A1 | 12/2009 | Friedman et al. | |
| 2010/0125477 A1* | 5/2010 | Mousseau et al. | 705/7 |
| 2010/0332629 A1 | 12/2010 | Cotugno et al. | |
| 2011/0093847 A1 | 4/2011 | Shah | |
| 2011/0107327 A1* | 5/2011 | Barkie et al. | 717/176 |
| 2011/0126168 A1 | 5/2011 | Ilyayev | |
| 2011/0145153 A1 | 6/2011 | Dawson et al. | |
| 2011/0153824 A1 | 6/2011 | Chikando et al. | |
| 2011/0161952 A1* | 6/2011 | Poddar et al. | 717/173 |
| 2011/0265077 A1* | 10/2011 | Collison et al. | 717/172 |
| 2011/0265081 A1* | 10/2011 | Lucovsky et al. | 717/177 |
| 2011/0265164 A1* | 10/2011 | Lucovsky et al. | 726/7 |
| 2011/0276951 A1* | 11/2011 | Jain | 717/140 |
| 2011/0302569 A1* | 12/2011 | Kunze et al. | 717/169 |
| 2011/0321031 A1* | 12/2011 | Dournov et al. | 717/171 |
| 2012/0030672 A1 | 2/2012 | Zygmuntowicz et al. | |
| 2012/0054731 A1* | 3/2012 | Aravamudan et al. | 717/170 |
| 2012/0066670 A1* | 3/2012 | McCarthy et al. | 717/169 |
| 2012/0089726 A1 | 4/2012 | Doddavula | |
| 2012/0102486 A1* | 4/2012 | Yendluri | 717/177 |
| 2012/0117560 A1* | 5/2012 | Vorthmann et al. | 717/177 |
| 2012/0137281 A1* | 5/2012 | Kleiner et al. | 717/174 |
| 2012/0151442 A1* | 6/2012 | Aslam et al. | 717/121 |
| 2012/0180039 A1* | 7/2012 | Bravery et al. | 717/178 |
| 2012/0311523 A1* | 12/2012 | Venkataraman et al. | 717/104 |
| 2013/0067459 A1* | 3/2013 | Sannidhanam et al. | 717/176 |
| 2013/0091488 A1* | 4/2013 | Koutyrine et al. | 717/120 |
| 2013/0167112 A1* | 6/2013 | Bostian et al. | 717/106 |
| 2013/0167128 A1* | 6/2013 | Narayana Iyer et al. | 717/143 |
| 2013/0167136 A1* | 6/2013 | Goldman | 717/175 |
| 2013/0174122 A1* | 7/2013 | Watters et al. | 717/121 |
| 2014/0040656 A1* | 2/2014 | Ho et al. | 714/3 |

OTHER PUBLICATIONS

Sekhar, K. R. et al., "The Fault Management System Using Amazon EC2: Web Application Deployment on Cloud," International Journal of Computer Science and Information Technologies, vol. 3 (1), 2012, 3063-3067.

"VMare Delivers Cloud Foundry, The Industry's First Open PaaS," http://www.vmware.com/company/news/releases/cloud-foundry-apr2011.html.

"Automated tools essential when deploying apps to the cloud," http://searchsoftwarequality.techtarget.com/feature/Automated-tools-essential-when-deploying-apps-to-the-cloud.

Electric Cloud—Automated Deployment, http://www.electric-cloud.com/solutions/automated-deployment.php.

"Oracle Cloud Computing," An Oracle White Paper, May 2010, 22 pages, http://www.oracle.com/us/technologies/cloud/oracle-cloud-computing-wp-076373.pdf.

* cited by examiner

METHODS AND SYSTEMS FOR AUTOMATED DEPLOYMENT OF SOFTWARE APPLICATIONS ON HETEROGENEOUS CLOUD ENVIRONMENTS

CROSS-REFERENCE TO RELATED PATENT APPLICATIONS

The present application claims priority under 35 U.S.C. §119 to Indian Patent Application No. 4599/CHE/2012, filed Nov. 2, 2012, and entitled "METHODS AND SYSTEMS FOR AUTOMATED DEPLOYMENT OF SOFTWARE APPLICATIONS ON HETEROGENEOUS CLOUD ENVIRONMENTS." The aforementioned application is incorporated herein by reference in its entirety.

FIELD OF THE DISCLOSURE

This disclosure relates generally to cloud computing environment. More particularly, exemplary embodiments of the present disclosure relate to systems and methods for deployment of applications onto multiple heterogeneous cloud environments.

BACKGROUND OF THE DISCLOSURE

Cloud computing is a network-based computing method, where shared resources such as software, content, application, etc. may be provided to consumers as an 'on-demand' service. Cloud computing providers generally offer their services according to three models: Software as a Service (SaaS), Platform as a Service (PaaS), and Infrastructure as a Service (IaaS). In the PaaS model, for example, cloud providers deliver a computing platform typically including an operating system, a programming language execution environment, a database, and a web server. Application developers can develop and run their software solutions on such a platform without the cost and complexity of buying and managing the underlying hardware and software layers.

In recent times, many enterprise applications or other software applications are being migrated to cloud environments to be in line with the next generation business requirements. In this transition process many challenges are encountered while deploying software applications from non-cloud environments to heterogeneous cloud environments such as PaaS environments. One of the challenges is the lack of standards in configuring different cloud environments. Also, available deployment tools offer only limited support for heterogeneous cloud environments for deploying standalone applications onto cloud environments. Thus, users who wish to deploy software applications to heterogeneous cloud environments may be forced towards adopting a manual deployment process. The manual deployment process may be prone to error, inefficient, and success or failure of the deployment may depend on the individual skill and knowledge of the person performing deployment. Accordingly, there is a need for an improved deployment tool that can deploy software applications from non-cloud environment to heterogeneous cloud environments such as PaaS environments.

Another issue, that may not be addressed by existing deployment tools, is the assessment of source and target platform readiness before starting actual deployment. The source platform refers to the platform from where software applications are deployed to the target platform in the target cloud environment, and the target platform refers to the platform in the cloud environment where the applications are deployed. The assessment of source and target platform readiness may include assessing issues with interoperability & compatibility between the source and target platforms, enterprise application prior to deployment. Some of these interoperability and compatibility issues are dynamic in nature and may become further complex in case of simultaneous deployment of enterprise application onto heterogeneous PaaS environment. Another issue that may not be addressed by existing deployment tools is how to deal with partially compatible and/or interoperable situations and make appropriate decisions that is suitable for the current business need.

Existing deployment tools may also be unable to handle deployment related issues like ensuring connectivity, security, availability, controllability during simultaneous deployment of enterprise application in multiple heterogeneous PaaS environments. Issues involved in decision making on whether to resume/rollback/abort in the event of failure at different steps of the deployment process are significantly complex and the complexity increases drastically in case of simultaneous deployment in multiple heterogeneous PaaS environments. Existing tools may not be able to satisfactorily handle such complex issues during deployment.

Furthermore, existing deployment tools may not be sufficiently adept at handling post deployment issues such as checking the successful deployment of the enterprise application after deployment by performing sanity check and dry-run of the enterprise application. These checks and subsequent decision making may be tedious in nature due to large number of dependencies that may exist on the platform-components, configuration, and application-data. The task may become further complicated in case of simultaneous deployment on multiple heterogeneous PaaS environments.

Therefore, there exists a need for systems and methods for improved simultaneous deployment of a portfolio of software applications developed in a non-cloud environment onto multiple heterogeneous PaaS cloud environments.

SUMMARY

In one aspect, the present disclosure is directed to a method of deploying at least one software application from at least one source platform to at least one target platform. The method may include obtaining configuration data on interdependency between the at least one target platform and the at least one software application. The method may further include checking a readiness of the at least one source platform for initiating deployment of the at least one software application. The method may further include checking a readiness of the at least one target platform for initiating deployment of the at least one software application and performing a selective deployment of the at least one software application after the readiness check. The method may further include performing a post-deployment assessment of the selectively deployed at least one software application after the selective deployment, wherein the post-deployment assessment includes checking a status parameter of the selectively deployed at least one software application.

In another aspect, the present disclosure is directed to a method of deploying a plurality of software applications to one or more remote environments. The method may include determining whether resources required for simultaneous deployment of the plurality of software applications are available and selectively deploying the plurality of software applications on the one or more remote environments based on the determination. Further, the determining may include checking for interdependency between the plurality of software applications.

In yet another aspect, the present disclosure is directed to an interconnected software deployment system. The system may include at least one source platform for obtaining at least one software application. The system may further include at least one target platform in at least one cloud environment, the at least one software application to be deployed on the at least one target platform. The system may further include a software deployment tool including an integration module, a deployer module, and a monitoring module. The integration module may be configured to communicate with the at least one source platform and the at least one target platform. The deployer module may be configured to implement a deployment process through the integration module. The deployment process may include obtaining configuration data on interdependency between the at least one target platform and the at least one software application, checking readiness of the source platform for initiating deployment of the at least one software application, and checking readiness of the target platform for initiating deployment of the at least one software application. The deployment process may further include performing a selective deployment of the at least one software application after the readiness check, and performing a post-deployment assessment of the selectively deployed at least one software application after the deployment, wherein the post-deployment assessment includes checking a status parameter of the selectively deployed at least one software application. The monitoring module may be configured to monitor the at least one source platform, the at least one target platform, an application status of the at least one software application on the at least one target platform, and the deployment process implemented by the deployer module.

In yet another aspect, the present disclosure may be directed to a software deployment system comprising a hardware processor and a memory configured to store instructions executable by the hardware processor. The hardware processor may be configured by the instructions to determine whether resources required for simultaneous deployment of the plurality of software applications are available, and selectively deploy the plurality of software applications on the one or more remote environments based on the determination. The determining may include checking for interdependency between the plurality of software applications.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Now, exemplary embodiments of the present disclosure will be described with reference to the accompanying drawings. Wherever possible, the same reference numbers will be used throughout the drawings to refer to the same or like parts.

Figure 1:
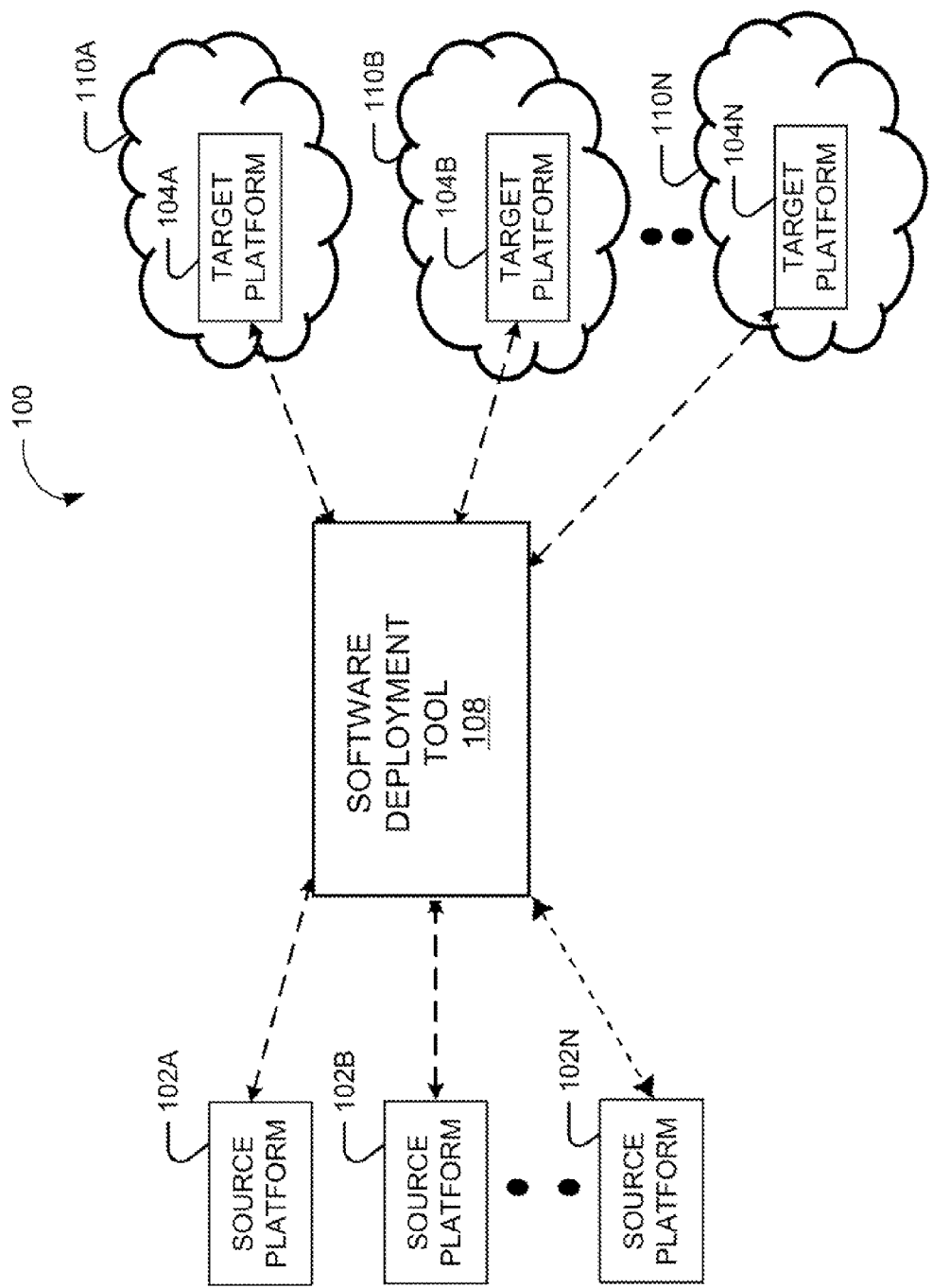
FIG. 1 illustrates an exemplary environment, where various embodiments of the present disclosure may function.

FIG. 1 illustrates an exemplary environment 100, where various exemplary embodiments of the present disclosure may function. The environment 100 may include one or more source platforms 102A-102N, one or more target platforms 104A-104N, and a software deployment tool 108. The software deployment tool may be provided in a standalone server or on a Cloud Saas environment. The target platforms 104A-104N may be included in one or more cloud environments 110A-110N. Exemplarily, each cloud environment 110A-110N (collectively "cloud environments 110") may be a platform-as-a-service (PaaS) environment. While exemplary embodiments described herein relate to platform-as-a-service (PaaS) environments, it will be understood by one of ordinary skill in the art that the teachings of the present disclosure may be applicable to other cloud environments such as Software-as-a-Service (SAAS), or any other cloud based future application development or deployment environments.

The source platforms 102A-102N ("source platforms 102") may exchange data and communicate with another network, in addition to the software deployment tool 108. As used here, source platform 102 may refer to a single source platform or multiple source platforms. Examples of source platforms include a personal computer, a server computer, a mobile phone, and so forth. The source platforms 102 may have source application resources such as files, scripts, or configuration data required for deployment of a software application onto the target platforms 104A-104N. The source application resources may be available within an appropriate folder structure along with dependent resources, and each source platform 102 may be associated with a single application or a group of applications.

Each source platform 102 may also include an application programming interface (API) where a user can develop software applications. API's may be available for developing in the Java programming language.

Each cloud environment 110 may include one or more target platforms 104A-104N (collectively, "target platforms 104"). The target platforms 104A-104N may be capable of exchanging data with software deployment tool 108 and each other. Each target platform 104 may include the required infrastructure, such as database, application server, VM, etc., required for an application to run on the target platform 104. Each target platform 104 may be accessible to entities with appropriate access credentials. Based on the specified preference, as provided by for example, an authorized person such as a deployment administrator, the target platforms could be classified as Critical or Optional.

Software applications may be developed from the source platforms 102 to on one or more of the target platforms 104.

The source platforms 102 are typically part of a non-cloud based environment but could also be part of a cloud based environment.

The software deployment tool 108 may include a general-purpose computer having a central processor unit (CPU), and memory/storage devices that store data and various programs such as an operating system and one or more application programs. Other examples of the software deployment tool 108 may include a workstation, a server, a special purpose device or component, a broadcast system, other equipment, or some combination thereof capable of responding to and executing instructions in a defined manner. The software deployment tool 108 also may include an input/output (I/O) device (e.g., video and audio input and conversion capability), and peripheral equipment such as a communications card or device (e.g., a modem or a network adapter) for exchanging data with the source platforms 102 and target platforms 104.

Figure 2:
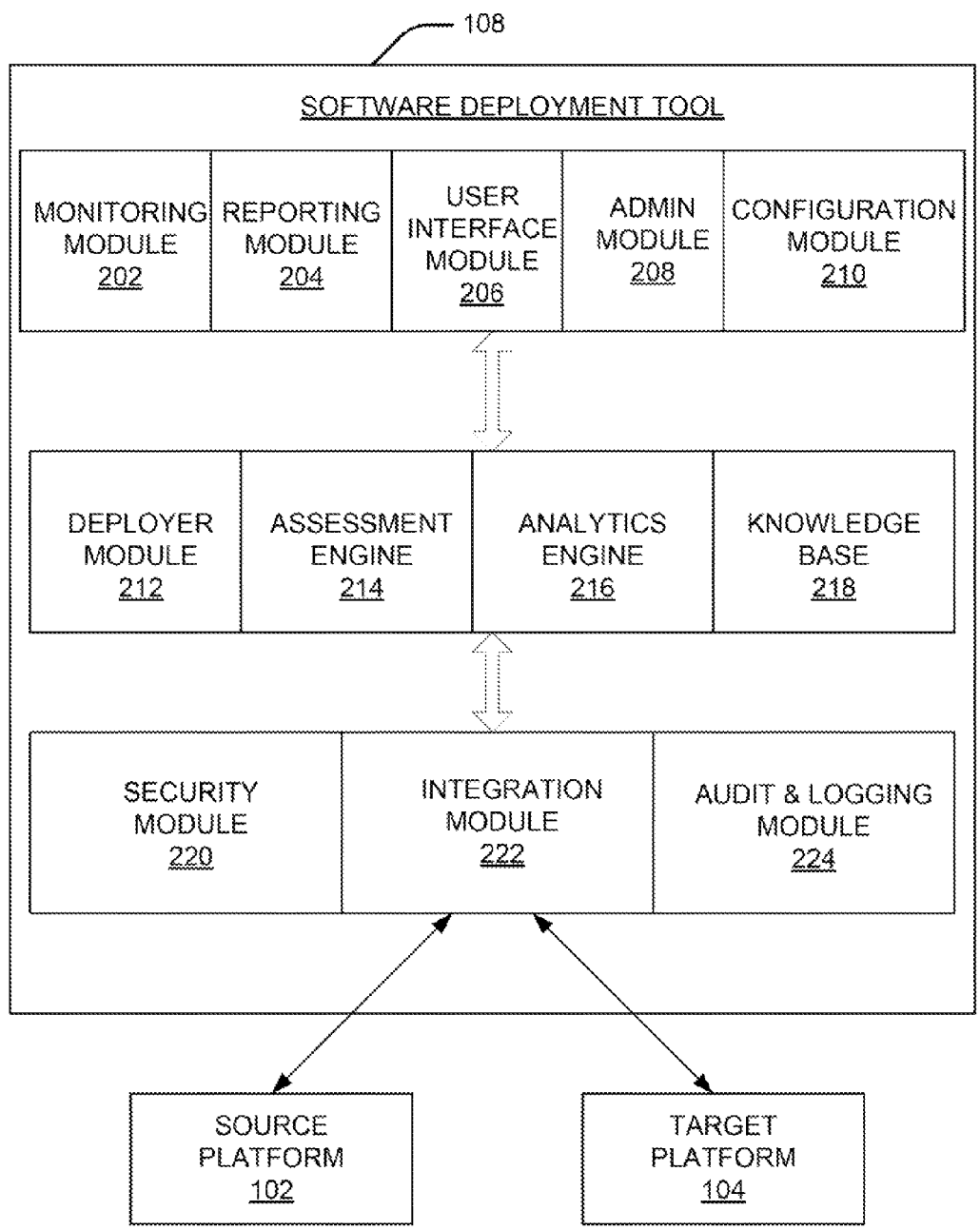
FIG. 2 illustrates exemplary components of the software deployment tool, in accordance with various embodiments of the present disclosure.

FIG. 2 illustrates an exemplary implementation of the software deployment tool 108. Prior to explaining this exemplary implementation, certain salient aspects of the software deployment process implemented by the software deployment tool 108 are explained. The deployment process implemented by the software deployment tool 108 may be thought of as including at least the following three phases: (1) readiness and configuration check phase, (2) controlled deployment phase, and (3) post-deployment assessment phase. The software deployment tool 108 may implement one or more of the above three phases.

Briefly, during the readiness and configuration phase, the software deployment tool 108 may evaluate compatibility of the developed application (the application to be deployed from the source platforms) on the target platform, interoperability between the source & target platforms, etc. Exemplarily, during this phase, the software deployment tool 108 may gather configuration data for use in deployment of the developed application on the target platforms, may check for interdependency between the target platforms and between the developed applications, etc. Further, during this phase, the software deployment tool 108 may check that resources required for the successful deployment of the developed applications on the target platform are available.

During the controlled deployment stage, the software deployment tool 108 may perform a controlled deployment of the developed application on to the target platform. In this phase, the software deployment tool 108 may attempt to deploy the developed applications on to the target platform and continually assess the deployment for any problems. If any problems are encountered, the software deployment tool 108 may attempt redeployment or attempt to perform a selective deployment of a subset of the developed applications based on certain parameters (e.g., criticality of target platforms, interdependency between software applications, etc.).

During the post deployment assessment stage, the software deployment tool 108 may check to see if the deployment was successful (e.g., by checking if the deployed applications start successfully on the target platforms where they are deployed) and if not, whether the deployed applications should be rolled back. In this stage, the software deployment tool 108 may also decide the extent of rollback if rollback becomes necessary. For example, the software deployment may decide to only rollback certain applications or rollback deployment on only certain target platforms.

While briefly described above, exemplary descriptions of each of these phases (e.g., readiness and configuration check, controlled deployment, and post-deployment assessment) will now be provided in turn (and in later sections of the Detailed Description), beginning with the readiness and configuration check.

Readiness and Configuration Check

In the readiness and configuration check phase, the software deployment tool 108 may evaluate compatibility of the developed application (the application to be deployed from the source platforms) on the target platform, interoperability between the source & target platforms, etc. The readiness and configuration check may be broadly divided into platform related checks and application related checks.

Platform Related Checks

One of the aspects of deployment configuration is mapping of source and target/destination file-system folders. As an example, the target PaaS file-system may be a virtual file-system with diverse possible formats, while the source file-system may be a physical file-system. Hence their structures and other characteristics are likely to be different. For example the access permissions, etc., may be different. This may pose a challenge to the person doing manual deployment to crosscheck necessary compatibilities manually without adequate knowledge & skills about both the source and target platforms and operating systems. Even if the person has adequate knowledge & skills, it is time & effort intensive. Also, manual deployment may introduce human error. Accordingly, one of the aspects that may be implemented by the software deployment tool 108, is the ability to automate such checking.

Another aspect of the pre-deployment configuration process may be to check and configure necessary environment related parameters like domain, application template, node instances, namespace, ssh key, cartridges, DB Socket and DBHost and port, RSA Private key and the like. In a manual model of configuration, the end user has to have knowledge & skill to execute platform specific commands in order to complete this activity. Accordingly, one of the aspects that may be implemented by the software deployment tool 108, is the ability to automate such checking and configuring.

Other platform related checks that may be implemented by the software deployment tool 108 may include checking the real-time state of the target platform to choose between hot and cold deployment options. Hot deployment refers to the ability of making changes to a running application without causing any downtime or without restarting the platform or the server. Cold deployment refers to the ability of making changes to a running application by restarting the platform or the server. Therefore, there may be a downtime in cold deployment process.

Further, in case of a target platform not being ready or available during manual deployment, the person performing deployment may not get to know when the platform becomes ready for deployment. For example, there may be a need to monitor status of the target platform in a frequent polling mode. This is time & effort consuming and also in case the polling interval is large, availability expectation of the application on the target platform may be affected. Accordingly, one of the aspects that may be implemented by the software deployment tool 108, is the ability to automate such polling.

Application Related Checks

In some situations (for example, migration of a stand-alone enterprise application to cloud PaaS environment), there may be a need to check for compatibility of all the pre-requisite software applications before the actual deployment starts. While it is not necessary for the source and target platforms to have exactly same versions of pre-requite software, some amount of cross compatibility may be desired. Accordingly, the software deployment tool 108 may perform certain checks such as checking compatibility of application servers, database servers, and other components & utilities.

Controlled Deployment

In the controlled deployment phase, the software deployment tool 108 may deal with several deployment related issues, such as connectivity, security, availability, controllability of simultaneous deployment of enterprise applications across multiple target platforms and the like. Some of these issues may occur simultaneously or at different stages in the deployment process. An exemplary listing of issues is below:

(a) Transfer of deployable files to target PaaS environment: connectivity related issues, security/access issues, availability of file-system, availability of space, disruption in transfer process, etc.

(b) Stopping existing application and related services: resource deadlocks, authorization, etc.

(c) Back-up existing application: In case of an incremental deployment, it is essential to take back-up of the existing application and data. There may be issues related to security/access issues, availability of file-system, availability of space, etc.

(d) Placing appropriate files in appropriate places on the target PaaS environment: security/access issues, availability of file-system, availability of space, etc.

(e) Running Application configuration and data scripts: security/access issues, success of individual steps of configuration and dependency on other steps, availability of required resources on the target environment, etc.

(f) Checking the run-time environment of the deployed application on target platform: This check may be quite complex, effort and skill intensive depending on the number of parameters to check (Ex: VM size, DB connection pool, pre-requisite application data), complexity of the application and diversity of the target platforms.

(g) Application start-up check: resource deadlocks, authorization, resource constraint, etc.

In the controlled deployment phase, one or more of the above exemplary issues (or other issues) may come up and the software deployment tool 108 may need to make real-time decisions, whether to continue the remaining part of the deployment process or abort it. In case of an abortion of deployment process, there may be a need to restore the target platform to its previous state in case it is not possible to re-start deployment in the current state to repair and complete the remaining deployment steps. Where repair is not possible, there may be a need to initiate rollback operation to clean up the unsuccessful deployment. And the repair and clean-up process may get quite complex depending on the current state of deployment and the PaaS environment characteristics. Accordingly, one of the aspects that may be implemented by the software deployment tool 108, is the ability to automate such checking and taking of corrective actions.

Post-Deployment

In the post-deployment assessment phase, the software deployment tool 108 may check for problems in the deployed software applications and decide whether to rollback one or more of the deployed software applications. An exemplary aspect of the post-deployment assessment phase may be a dry run check, which may involve checking if the deployed application(s) starts successfully in the target PaaS platform where it has been deployed, or performing sanity checks of applications including checking some of the key inputs and outputs (Database, XML feeds, etc.).

With the above description on the general aspects of the software deployment tool 108, FIG. 2 illustrates the exemplary components of the software deployment tool 108, in accordance with various embodiments of the present disclosure. As shown, the software deployment tool 108 may include multiple constituent modules that can be divided into three groups. The first group includes a monitoring module 202, a reporting module 204, a user interface module 206, an admin module 208, and a configuration module 210. The second group includes a deployer module 212, an assessment module 214, an analytics engine 216, and a knowledge base 218. The third group includes a security module 220, an integration module 222, and an audit and logging module 224.

The monitoring module 202 may monitor each source platform 102 and target platform 104. The monitoring module 202 may also monitor the complete deployment process including all stages of the deployment process including checking availability of required resources on the source platforms 102 and the target platforms 104, and also checking the status of the deployed application on each target platform 104 on a semi-real time basis. The monitoring module 202 may be configured to pause and un-pause the monitoring process based on certain conditions.

The monitoring module 202 may also check the availability of the source platform 102 and the target platform 104. Although FIG. 2 shows only one source platform 102 and one target platform 104, a person skilled in the art will appreciate that there can be more than one source platform 102 and target platform 104. The monitoring module 202 may monitor the simultaneous or staged deployment of one or more applications on the multiple target platforms 104 associated with the multiple cloud environments 110. The application(s) may be developed on the source platforms 102 that are part of non-cloud environment or elsewhere. The monitoring module 202 may also check the availability of resources that are required by the application to run on the target platform 104, and availability of resources on the source platform 102. The resources can be files, database, data, scripts, folders, application container, and operating systems, required for proper deployment of the software application on the target platforms 104. At any given time, the monitoring module 202 may also keep track of the status of the set of applications on each target platform 104. The monitoring module 202 may also have a dashboard (not shown) to present or display monitoring related information on a semi-real-time basis. The dashboard may also access and display the past monitoring data stored in a database (not shown).

For each source platform 102 in the environment 100, the monitoring module 202 may be configured to check the status of connection of the source platforms 102 with the software deployment tool 108. The monitoring module 202 may monitor the connectivity to the source platform 102 through the integration module 222. The monitoring module 202 may also check the status of user sessions on the source platform 102. The monitoring module 202 may also monitor whether the appropriate user session exists on the source platform 102 through the integration module 222. The monitoring module 202 may also monitor the availability of the required resources such as file system, database, configuration, scripts, and so forth, on the source platform 102 through the integration module 222.

For each target platform 104, the monitoring module 202 may check the status of connection of the target platforms 104 with software deployment tool 108. The monitoring module 202 may monitor the connectivity to the target platform 104 through the integration module 222. The monitoring module 202 may also check the status of user sessions on the target platforms 104. The monitoring module 202 may monitor the existence of an appropriate user session on each target platform 104 through the integration module 222. The monitoring module 202 may monitor the availability and usage of resources (e.g., database, virtual machine, messaging, etc.) required for deployment of the software application on the target platforms 104 through the integration module 222. The monitoring module 202 may further monitor the existence of an application, and state of deployed applications through the integration module 222.

The monitoring module 202 may be configured to monitor the state of each deployed software applications on all the target platforms 104 through the integration module 222. The monitoring module 202 may monitor the version of the deployed software application(s) in all the target platforms 104 through the integration module 222. The monitoring module 202 may monitor the instances of applications in the target platforms 104 through the integration module 222.

The monitoring module 202 may also monitor the status of applications and resources during the three phases, e.g., pre deployment (readiness check), controlled deployment, and post-deployment assessment. During the readiness check process, the monitoring module 202 may obtain the status of readiness of the source platform 102 and the target platform 104 and update the status progress on the dashboard. During controlled deployment, the monitoring module 202 may keep track of file transfers between the at least one source platform 102 and the target platforms 104 on a real-time or semi-real-time basis. The monitoring module 202 may obtain status about the transfer from the integration module 222.

The monitoring module 202 may further monitor the instantaneous and cumulative progress status of individual and aggregated application deployments on single or multiple target platforms 104. The instantaneous progress status may be an individual outcome of execution of each activity within a deployment stage. In an exemplary scenario of a single application deployment to a single target platform 104, when a single deployment step fails impacting the progress of deployment, such a failure may be termed as an instantaneous deployment failure. The cumulative status may be a cumulative outcome of execution of multiple related activities within a deployment stage. In an exemplary scenario of single application deployment to a single target platform 104, when failure of multiple deployment steps impacts the progress of deployment, such a failure is known as cumulative deployment failure. The end result of each stage of deployment of a single application on a single cloud or PaaS based target platform 104 is known as individual deployment status.

The end result of each stage of deployment of dependent multiple applications on a single cloud or PaaS based target platform 104 or on a group of dependent target platforms 104 is called aggregated deployment status. Consider a scenario of deployment of multiple applications in multiple target platforms 104. Failure of an application deployment on one target platform 104 resulting in rolling back of the application in all dependent platforms is known as aggregated deployment status. Failure of deployment of all dependent applications on a single target platform 104 that results in rolling back all of these applications in that target platform 104 is also known as aggregated deployment status. Now, consider a scenario where deployment is initiated on 5 target platforms 104, i.e., 104A to 104E. Here, the target platform 104A, 104C, and 104E are configured as critically dependent and the rest i.e., the target platforms 104B and 104D are configured as optional. During the deployment, if the target platform 104C encounters deployment failure, roll-back is initiated in all five target platforms 104A-104E irrespective of their respective deployment status. This would be an aggregated deployment failure.

During the deployment process, the monitoring module 202 may also monitor the progress of configuration scripts, which run as part of the deployment process and update status (on the dashboard, for example) by checking the logs at each target platform 104. During post-deployment, the monitoring module 202 may monitor the progress of a sanity test and update status (on the dashboard, for example).

The software deployment tool 108 may further include the reporting module 204 which may be configured to provide a comprehensive report after completion of all the stages of deployment. The reports may be of various types, including standard and custom reports. The reporting module 204 may generate historical reports based on the previous deployments. The reporting module 204 may use the configuration module 210, the audit and logging module 224, and the knowledge base 218 for obtaining required data and may use the analytics engine 216 and the knowledge base 218 for producing the report. The custom report templates may be prepared using the configuration module 210 and the security module 220. The generated reports may be archived in a reporting repository (not shown).

The software deployment tool 108 also includes the user interface module 206, which may provide one or more login screens to one or more users. The user interface module 206 (UI module 206) may be configured to accept inputs from users. The UI module 206 works with the configuration module 210 to obtain preferences from users to load the appropriate screens. The UI module 206 may be configured to obtain a list of registered applications and the cloud environments 110 (or PaaS environments 110) from the configuration module 210 to render to the user for receiving user selections. As per the user selection, the respective phase of deployment (i.e., readiness check or deployment or post-deployment assessment) is initiated. The UI module 206 may further provide screens including, but not limited to, a configuration settings screen, a screen to list historical deployments for the signed-in user, a screen to list all applications and platforms previously used by the signed-in user, a screen to list all applications and platforms that the signed-in user has entitlement, a screen for registering an application or a platform or a user, and so forth.

The admin module 208 is configured for user registration, application registration, platform registration, and application and deployment management. The admin module 208 may perform the user registration by working with the configuration module 210, and the security module 220 in creation and maintenance of users. This may be performed with assistance from a user, including, for example, an authorized user. The admin module 208 may perform the application registration by working with the configuration module 210, and the security module 220 in creation and maintenance of registered application records including the information about the source platforms 102. This may be performed with assistance from any user, or alternatively only an authorized user.

The admin module 208 may perform platform registration by working with the configuration module 210, and the security module 220 in creation and maintenance of records of registered target platforms 104. This may be performed with assistance from any user, or alternatively only an authorized user. The information about the registered application records, registered source platforms 102 and registered target platforms 104 may be persisted in the security module 220 and in the knowledge base 218.

The admin module 208 may be further configured for application and deployment management. The admin module 208 may perform the operations to start, stop, restart, and backup for the application(s) on the target platforms 104 through, for example, the integration module 222. The admin module 208 may also perform a forced rollback through, for example, the deployer module 212 on deployments as initiated by any user, or alternatively only an authorized user. The permitted application administration operations for a respective user may be obtained from the configuration module 210. The admin module 208, in accordance with the user's access rights obtained from security module 220, may perform administration activities on the target platforms 104.

The software deployment tool 108 also includes the audit and logging module 224 that may be configured to maintain a log or a record of all activities and related status in the system. Modules of software deployment tool 108 may use this log or record. The log or record may also be used for reporting and analysis.

The software deployment tool 108 also includes the deployer module 212 configured to perform the readiness-check, controlled deployment and post-deployment activities. During all or part of the activities in the differing stages of the deployment process, the deployer module 212 may update the monitoring module 202 with all monitoring information. The deployer module 212 may also obtain configuration details of source platform 102 and target platform 104 and application(s) from the configuration module 210. The deployer module 212 may work with the integration module 222 in the process of transferring the required resources (files, scripts, configuration, data, etc.) from the source platform(s) 102 to the target platform(s) 104.

Based on the application deployment type, such as incremental or full deployment, obtained from the configuration module 210, the deployer module 212 may perform full or incremental deployment. Based on the deployment mode, such as hot deployment or cold deployment, obtained from the configuration module 210, the deployer module 212 may further perform a hot or cold deployment. In case of incremental deployment, the deployer module 212 works with the monitoring module 202 to find the application status in the target platform 104. Prior to deployment, the deployer module 212 may stop the application in the target platform 104. The deployer module 212 may also back-up the application through the integration module 222. The deployer module 212 may further execute configuration scripts obtained from the configuration module 210.

In situations where there may be a deployment failure, the deployer module 212 may roll-back depending on the type of rollback obtained from the configuration module 210 and the knowledge base 218. There can be different types of rollbacks depending on the scenario. Exemplary rollbacks may include, rollbacks per application per platform, group of applications per platform, per application from group of platforms, group of applications from group of platforms, and so forth. The deployer module 212 may obtain sanity test details from the configuration module 210 and may execute sanity tests on the newly deployed applications. In addition to the communications discussed, additional or all other communications and activities with the target platform(s) 104 and the source platform(s) 102 may be performed by the deployer module 212 through the integration module 222.

The deployer module 212 may further provide the configuration details related to the source platforms 102, the target platforms 104 and applications for a signed-in user to an assessment engine 214. The assessment engine 214 works with the monitoring module 202 to determine the availability of source platforms 102 and target platforms 104. During the deployment stages, the assessment engine 214 may perform the pre-deployment (or readiness-check) assessment and post-deployment-assessment. In addition, during execution of an activity at any stage of deployment, if any problem has been encountered, the assessment engine 214 may perform the problem assessment and obtain possible solution(s) with the help of knowledge base 218 and analytics engine 216.

In addition, some or all of the modules of the software deployment tool 108 that want to perform an analysis may use the analytics engine 216. For example, the reporting module 204 may use the analytics engine 216 to perform report related calculations (e.g., time taken for deployment, percentage of the failed sanity tests), the deployer module 212 may use the analytics engine 216 for analysis of problem(s) encountered or a readiness check, the knowledge base 218 may use the analytics engine 216 to analyze deployment process data (current and historical) to create information that is stored in the knowledge base 218.

The configuration module 210 of software deployment tool 108 may permit registered user(s) to manage configuration logistics by obtaining user credentials or configuration details from the security module 220. The configuration details may be categorized into monitoring, reporting, deployer, source platform, target platform, user preference, and the like. The configuration parameters of the monitoring category for each source platform 102 and target platform 104 can be a number of re-try(s), interval between retry(s), resource locator for the source platforms 102 and the target platforms 104, dependencies between the source platforms 102 and the target platforms 104, and so forth.

The configuration parameters for each application may include, but are not limited to, the final status of deployment (success/failure), time taken for deployment, number of retry(s) prior to deployment. The configuration parameters for the deployer category can be a deployment type, deployment mode, type of rollback, and so forth. The configuration parameters for the source platform category may include, but are not limited to, source parameters, root folder(s), application parameters, application name, list of resources, list of files, descriptors, application type, size, and so forth. The configuration parameters of the target platform category can include, but are not limited to, target parameters, domain name, platform type (Critical or Optional), target folder, virtual machine identity (ID), application parameters, app name, app version, app type, app status, and so forth. The configuration parameters of the user preference category can be, but are not limited to, application types such source file, application status in target platform, type of target platforms, restore last user session, display deployment history, time out duration, notification setting (e.g., email, sms targets, etc.), and so forth.

The knowledge base 218 of the software deployment tool 108 may store all current data, historical data, baseline configurations, etc. The knowledge base 218 may also maintain knowledge harvested from the past deployments. The current data may include registered platform details, registered application details, registered user details including roles, list of rules for assessment and validations, status, configuration and assessment information along with the relevant context, and so forth. The historical data may include details of past configurations along with the relevant context, past user preferences with the relevant context, process details of past deployment activities along with the relevant context, details about problems/issues and resolutions that happened in the past along with the relevant context, past status data from the dashboard along with the relevant context, past issues/problems encountered and solutions in relevant context, past rules for assessments and validations, and so forth.

The knowledge base 218 may also include knowledge such as high-level configuration details about different types of platforms (for example, target platforms 104), dependency information (for example, applications, platforms, preferences, etc.), specific information on resources and communication mechanism (for example, mode, protocol, message-format, etc.), list of necessary commands, etc. for each target platform 104 (for example, each target platform 104 has its own mechanism for connection and remote operations), information on necessary pre-requisites (infrastructure, resources, etc.) for each application to be deployed on each type of target platform 104, mapping between known issues/problems and solutions in relevant context, and so forth. The knowledge base 218 may be further configured to harvest knowledge by using the analytics engine 216 and information such as historical data, data from the security module 220 and data from the configuration module 210. The knowledge base 218 may also classify, segregate, and analyze (or correlate) relevant data based on the context such as user, platform, applications, configurations, status information from each stages. The knowledge base 218 may further create new information to be used as knowledge or may update existing information based on system analysis.

The knowledge base 218 may also maintain the rules of the source platforms 102 and target platforms 104. The knowledge base 218 may also create rules based on results of assessments of each deployment. The results of these assessments may be stored in the knowledge base repository and retrieved for other deployments and used to check the parameters. The first set of rules may be created by the administrator (or other users) using the configuration module 210 and stored in the knowledge base 218. From time to time, the knowledge base 218 may automatically create new rules or update an existing rule based on harvested knowledge. These rules may be used by the analytics engine 216 in some or all phases of the deployment process (e.g., readiness check, controlled deployment and post-deployment assessment).

For example, during the readiness check phase, the analytics engine 216 may use the rules to check availability of resources (for example, files, scripts, configuration, data, libraries, etc.) for each application. If issues are encountered during controlled deployment phase, the analytics engine 216 may use the rules to assess the problem. Similarly, during a sanity check, dry run issues may be encountered during post-deployment assessment. In those situations, the analytics engine 216 may use the rules to obtain possible resolutions.

An example of an assessment rule for a deployment assessment is shown below:

---

[condition(s)] : [outcome] [Format of the rule definition]
targetName is not null || is not empty || length > 8 : TargetName should not be empty or null or length should be greater than 8
targetAppName = sourceAppName and targetAppVersion > sourceAppVersion : Not ready for incremental deployment.
targetAppName != sourceAppName : Not ready for incremental deployment
targetPlatform1 is (Critical dependent): aggregated deployment failure for all the dependent target platforms.

---

Regarding the security module 220, it may manage access or provide permission management for users of the software deployment tool 108. The security module 220 may also perform user validations in terms of access and authorization.

As for the integration module 222, all of the necessary communications (such as appropriate web service calls and exchange of status information between the integration module 222 and the target platforms 104) happens through various means, such as a webservice API through a service gateway, a message through a message broker, etc. on each target platform 104. Exemplarily, the deployer module 212 may perform the readiness checking, controlled deployment, and post-deployment assessment through the integration module 222. During pre-deployment assessment stage (e.g., readiness check), the deployer module 212 may provide some or all of the necessary configuration information to the integration module 222 for the purpose of performing status checks and verification of some of the platforms and resources for readiness. The integration module 222 may initiate access to different source platform(s) 102 and target platforms 104 by establishing connections to the respective platforms using user credentials. Once connection has been established, the integration module 222 may use available interface and services specific to the target platforms 104 and the source platforms 102 to perform status checks and verifications through remote operations.

During the pre-deployment assessment, in the source platform(s) 102, the integration module 222 may check file-system information for some or all of the necessary details as required by the deployer module 212.

During the pre-deployment assessment, in the target platform(s) 104, the integration module 222 may check the virtual file-system information for some or all of the necessary details as required by the deployer module 212. The integration module 222 may further check the virtual memory information for some or all of the necessary details as required by the deployer module 212. The integration module 222 may further check for the availability of required services (e.g., infrastructure services like database, application container, messaging service, etc.). The integration module 222 may also check for the availability of required resources (e.g., application files, configuration, data, scripts, schema, etc.). The integration module 222 may also check for the existence of an application on the target platform and its detailed status. Once a communication channel has been established, the integration module 222 may also perform continuous status checks and update the monitoring module 202 on a real-time or semi-real-time basis for the rest of the deployment process.

During the controlled deployment stage, the deployer module 212 may provide some or all of the necessary configuration information to the integration module 222 to assist in the transfer of files between the source platform(s) 102 and the target platforms 104, application-backup, application control, status and health checks of platforms, resources and the applications, etc. The integration module 222 may perform execution of some or all of the necessary application-scripts on the target platforms 104 remotely on behalf of the deployer module 212. The integration module 222 may also perform some or all of the necessary activities for rollback operation remotely on behalf of the deployer module 212. At the beginning of the controlled deployment stage, the integration module 222 may check the status of the communication with the source platform(s) 102 and the target platforms 104. If any of the communication channels are invalid, the integration module 222 may establish a new communication channel as needed.

During the post-deployment assessment stage, the deployer module 212 may provide some or all necessary configuration information to the integration module 222 for the purpose of performing one or more activities on the target platforms 104. The one or more activities may include checking the status of application and related resources or services on the target platforms 104, running necessary scripts for application administration, performing dependency checks for service and other resources, validating configuration and necessary data required for running the application, running necessary scripts for checking status of run-time components of the application, running necessary scripts for checking the basic behavior of the running application, etc.

At the beginning of the post-deployment assessment stage, the integration module 222 may check for status of the communication with the source and the target platforms 104. If any of the communication channels are invalid; the integration module 222 may establish a new communication channel as needed.

Figure 3:
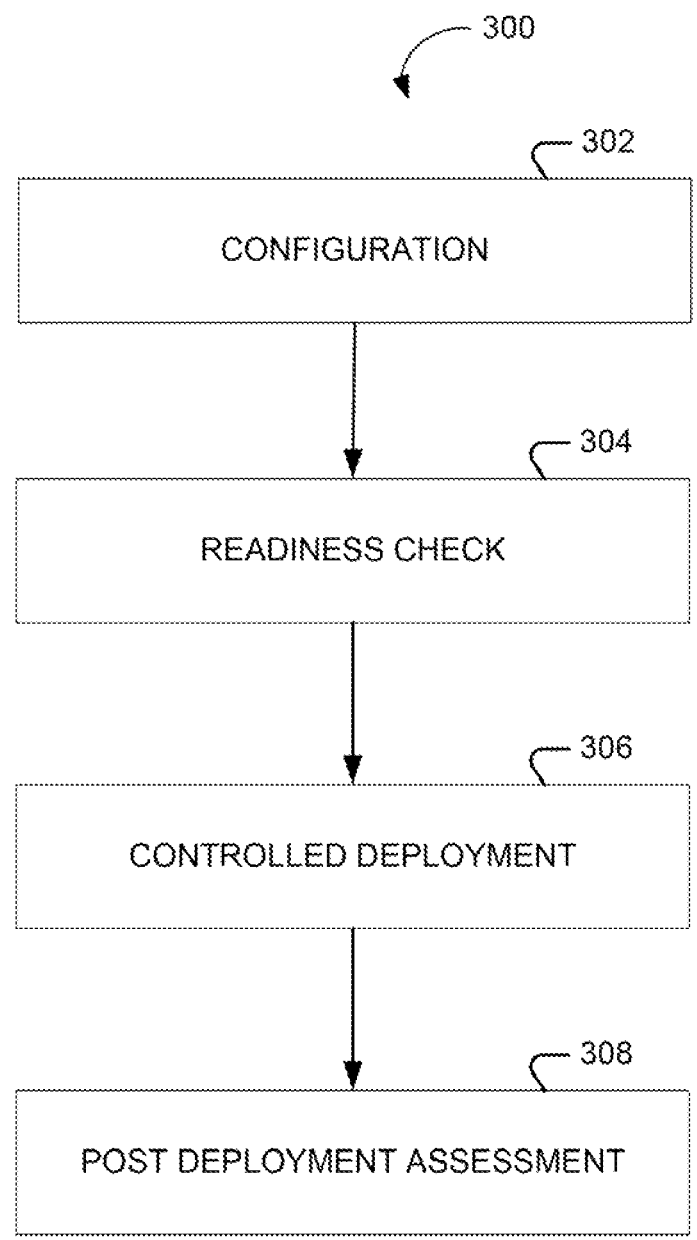
FIG. 3 is a flowchart illustrating exemplary stages of an exemplary deployment process implemented by the software deployment tool.

FIG. 3 is a flowchart illustrating exemplary stages of a deployment process 300. As discussed earlier, the deployment process can be broadly divided into three stages (e.g., readiness and configuration check, controlled deployment, and post-deployment assessment). The readiness and configuration check can be further thought of as two different stages, a configuration step and a readiness step. Accordingly, the deployment process 300 can be broken down into the following stages: configuration (step 302), readiness check (step 304), controlled deployment (step 306), and post-deployment assessment (step 308). All these stages are explained in connection with subsequent figures.

Figure 4:
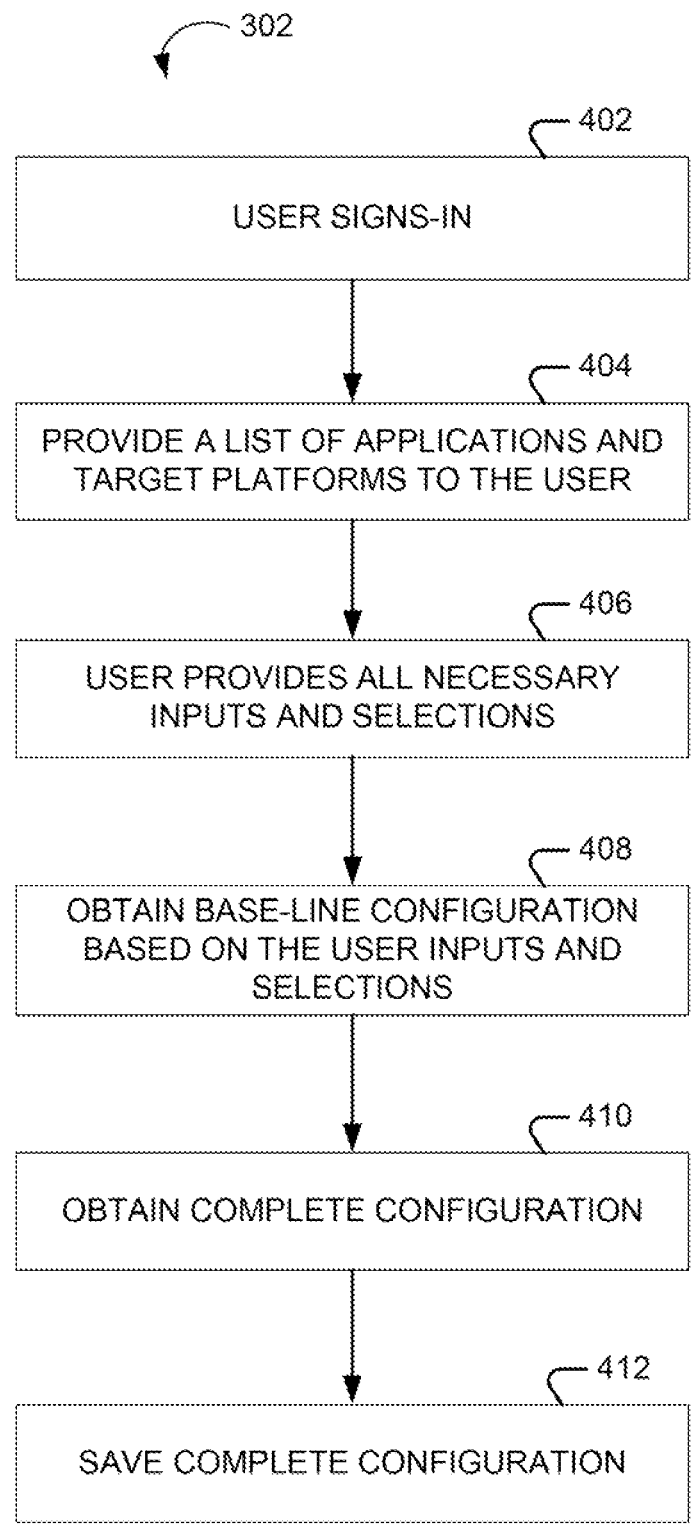
FIG. 4 is a flowchart illustrating exemplary steps in an exemplary configuration stage of the deployment process of FIG. 3.

FIG. 4 is a flowchart illustrating various steps of the configuration process (step 302) of the deployment process of FIG. 3. At step 402, a user may sign in by entering sign-in credentials. The UI module 206 may display a login screen where the user provides the sign-in credentials (user name, password). For example, for each target platform 104 on which the user wishes to deploy applications, the user may provide sign-in credentials. Once the user provides necessary inputs, the UI module 206 may contact the security module 220 to check the validity of user credentials and on successful validation, a user session may be created for the user, with the user profile obtained from the configuration module 210. At step 404, a list of applications and target platforms 104 may be provided to the user. The UI module 206 may obtain the list of all the previous deployments performed by the user from the configuration module 210 and display it to the user. The UI module 206 may also provide the user with options to initiate a new deployment or perform redeployment. In case of a new deployment, the UI module 206 may obtain the list of registered applications and target platforms 104 from the configuration module 210, for which the user is entitled to. In case the user opts for redeployment, then some or all of the necessary details of the previously performed deployment may be loaded in the UI module 206 for the user to incorporate any changes, if deemed necessary by the user.

At step 406, the user may provide all necessary inputs and selections. The user may select the application to be deployed and may also select the required target platform(s) 104. The user also may select the application deployment type (for example, Full or Incremental). The user may provide a selection for deployment mode (for example, Hot or Cold). The user may also provide selection for number of retries during deployment. The user may further provide selection for the type of rollback option (for example, Per-application, per-platform, etc.).

At step 408, based on the user inputs and selections, baseline configurations may be obtained. Once the user inputs are obtained, the configuration module 210 may retrieve the baseline configuration data from a configuration repository (not shown) depending on the details of the application and target platform 104. Some configuration details of target platforms 104 are resource locator, type of environment, mode of accessibility, etc.

At step 410, the complete configuration may be obtained. The configuration module 210 may retrieve the advanced configuration data regarding applications and target platform dependencies from the knowledge base 218 depending on the base-line configuration details. For example, executing Java application, JRE (Java Runtime Environment) is a dependency at platform level. Further, in Java applications that process XML, 'XML parser' (e.g. Xerces) is a dependency. Information about necessary resources may also be added to the configuration data. The configuration module 210 may also perform validations on the user provided parameters based on the rules retrieved from the knowledge base 218.

At step 412, the complete configuration may be saved. The configuration module 210 may save the complete configuration details into the configuration repository for the particular deployment and specific user, which may be made available for readiness check and deployment stages.

Figure 5:
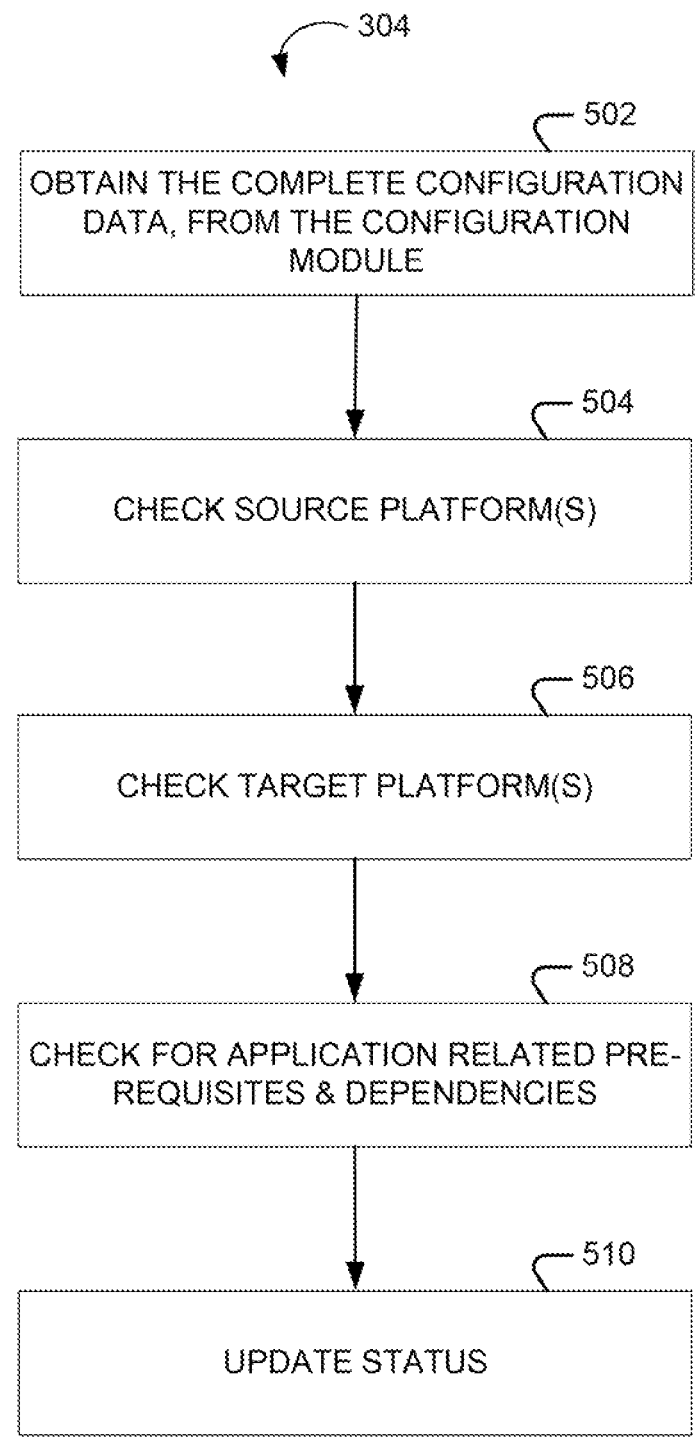
FIG. 5 is a flowchart illustrating exemplary steps in an exemplary readiness check stage of the deployment process of FIG. 3.

FIG. 5 is a flowchart illustrating various steps of the readiness check process 304 of FIG. 3. In step 502, the deployer module 212 may retrieve and provide the configuration data for the particular deployment and specific user to the configuration module 210.

At step 504, the source platforms 102 may be checked. For each source platform 102, the deployer module 212 may initiate readiness assessment using the assessment engine 214. The assessment engine 214 may check the availability of the at least one source platform 102 through the monitoring module 202. In case the source platform 102 is not available, the assessment engine 214 may check for an alternate source platform of the multiple source platforms 102. In case an alternate source platform is not found, the checking continues with checking availability of other source platforms. In case an alternate source platform is not found, the assessment engine 214 may decide based on dependency information if the current source platform 102 is critical or optional. If the current source platform (e.g., the at least one source platform 102) is critical and not available, the assessment engine 214 may notify the same to the deployer module 212 along with an assessment report. The deployer module 212 may wait until it receives a source platform 102 ready status from the monitoring module 202 for that particular source platform 102. If the at least one source platform 102 is optional and not available, the assessment engine 214 may continue availability checking with other source platforms. Simultaneously, for each source platform 104, the assessment engine 214 may update the deployer module 212 instantaneously. The deployer module 212 may in turn update the status of the source platform 102 to the dashboard. For each available platform, the assessment engine 214 may also check availability of resources for each application, necessary read permission and also validate folder and file structures, file types and size as per the available configuration information.

In step 506, the target platforms 104 are checked. Exemplarily, the deployer module 212 initiates readiness assessment for each of the target platforms 104 using the assessment engine 214. The assessment engine 214 may check the availability of the target platform 104 through the monitoring module 202. If the target platform 104 is critical and not available, the assessment engine 214 may notify the same to the deployer module 212 along with an assessment report. If the target platform is optional and not available, the assessment engine 214 may continue availability checking with other platforms. Simultaneously, for each target platform 104, the assessment engine 214 may update the deployer module 212 instantaneously. The deployer module 212 may in turn update the status of the target platform 104 on the dashboard.

For each available target platform 104, the assessment engine 214 may check availability of resources for each application, check necessary write permission(s) and also validate folder and file structures, file types, availability of space for the files and database, availability of application resources and size as per the available configuration information. The assessment engine 214 may check the availability of the required environmental settings and the software dependencies on the target platform 104. The assessment engine 214 may also check the status of application on the target platforms 104. In case of a new deployment, the assessment engine 214 may ensure that the new software applications don't overwrite on existing application(s). In case of an incremental deployment, the assessment engine 214 may ensure that the appropriate application is updated with the incremental version.

At step 508, the application related pre-requisites and dependencies are checked. Exemplarily, for each target platform 104, the deployer module 212 may initiate readiness assessment using the assessment engine 214 to check the dependencies within application components and across some or all of the dependent applications. The dependency check may include checking the availability of the application specific software pre-requisites (e.g., database, middleware components, application container etc.) and resources for all applications. In case of unavailability of these pre-requisites components, the assessment engine 214 may interact with the knowledge base 218 and resolve the issues and continue with the other application related pre-requisites and dependency checks.

Finally, status may be updated at step 510. After completion of all checks in the above steps 502 to 508, the assessment engine 214 may update the database of the knowledge base 218 and the audit and logging module 224 with details of issues or checks done in each step. Also, the issue resolution may be provided as an update to the user through the dashboard.

Figure 6:
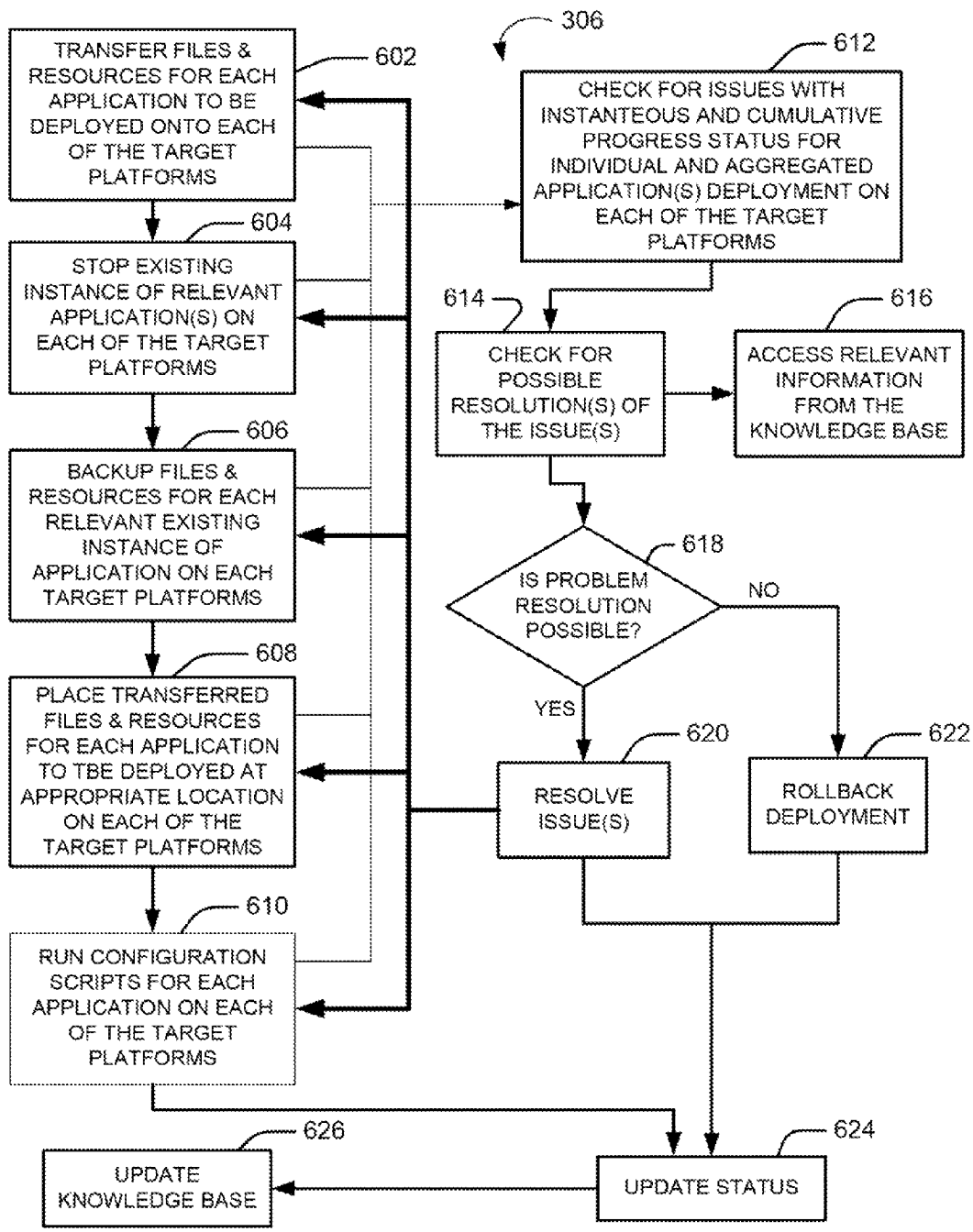
FIG. 6 is a flowchart illustrating exemplary steps in an exemplary controlled deployment stage of the deployment process of FIG. 3.

FIG. 6 is a flowchart illustrating various steps of the controlled deployment process 306 of FIG. 3. At step 602, files and resources for each application to be deployed may be transferred onto each target platform 104 as discussed with reference to FIGS. 1-2. The deployer module 212 may initiate the transfer for the application file from the source platform(s) 102 to each target platform 104 through the integration module 222. In case of a file transfer failure due to a server unavailability/folder permission issue (which may be found as a result of issue checking in step 612), etc., the deployer module 212 may check for possible issue resolutions in step 614 by accessing relevant information from the knowledge base 218 in step 616. Then at step 618, the deployer module 212 may determine whether the issue can be resolved. If the issue cannot be resolved, rollback may be initiated at step 622. Otherwise the issue may be resolved and control may be returned to the step where the issue occurred. A detailed explanation of steps 612-622 is provided later. It will be appreciated that steps 612-622 may be performed in coordination with each of steps 604-610.

At step 604, existing instance of relevant application(s) on each target platform 104 may be stopped. The deployer module 212 may use the admin module 208 to stop the existing instance of relevant applications(s) on each target platform 104. The monitoring module 202 may monitor the state of the application and update the deployer module 212 once the application stops to proceed with the next step. In case of not being able to stop the existing application instances in any of the target platforms 104, the deployer module 212 may check for possible issue resolution and potential rollback through steps 612-622.

At step 606, backup of files and resources for each relevant existing instance of applications to be deployed on each target platform 104, may be created. Exemplarily, the deployer module 212 may get the previous application files and libraries and store a back-up copy of the files and resources on each target platform 104 in a back-up folder along with its date and time and version of the files. In case the deployer module 212 is not able to back up the existing application files and resources in any of the target platforms 104, the deployer module 212 may check for issue resolution and potential rollback through steps 612-622.

At step 608, the transferred files and resources for each application to be deployed may be placed at an appropriate location on each target platform 104. Exemplarily, the deployer module 212 may place the transferred files and resources for each application to be deployed at an appropriate location on each target platform 104. In case the deployer module 212 is not able to place the transferred files and resources of each application to be deployed at an appropriate location on each target platform 104, the deployer module 212 may check for issue resolution and potential rollback through steps 612-622.

At step 610, the configuration scripts for each application to be deployed on each target platform 104 are executed. Exemplarily, the deployer module 212 may get the configuration and deployment scripts from the configuration module 210 and run the scripts in the sequence for each application on each target platform 104. In case of failure of any of the configuration and deployment scripts of any application to be deployed on any target platform 104, the deployer module 212 may check for issue resolution and potential rollback through steps 612-622.

At step 612, issues with instantaneous and cumulative progress status may be checked or identified for individual and aggregated application(s) deployment on the target platforms 104. The monitoring module 202 may notify the deployer module 212 regarding issues that may have occurred during any of the above steps.

At step 614, possible resolution(s) of the issue(s) may be checked. Exemplarily, the deployer module 212 may contact the knowledge base 218 for remedy recommendations for the issues identified during step 612 on each target platform 104. In case there is no recommendation for some of the issues, execution may transfer to step 622 for performing the rollback operation.

At step 616, relevant information from the knowledge base 218 may be accessed. The knowledge base 218 may check the database for resolution for the issues requested by the deployer module 212 and provide the recommendations for each issue on each target platform 104.

Step 618 refers to determining whether a resolution is possible for an identified problem. Based on recommendations of the knowledge base 218, the deployer module 212 determines whether the encountered deployment issues can be resolved or not on each target platform 104. If some of the issues cannot be resolved, step 622 is executed; otherwise control passes to step 620.

At step 620, the issues may be resolved. Based on the resolution obtained from the knowledge base 218, the deployer module 212 may resolve the issues by contacting the appropriate modules and processes required to resolve the issue.

At step 622, the rollback deployment may be performed. The deployer module 212 may initiate the rollback of the deployment on some or all of the target platforms 104 when there are no recommendations for the encountered issue or the recommended remedy doesn't resolve the actual issue in any of the target platforms 104. Rollback may happen to a subset of the target platforms. For example, if the deployment fails on an Optional target platform, roll back could occur only in the respective Optional platform. Once a rollback is completed, the system is updated on the status. The rollback is initiated in case of failures based on the rollback type obtained from the configuration module 210.

At step 624, the deployer module 212 may update the final deployment status to the analytics engine 216. The dashboard may pick-up the status from the analytics engine 216 and notify the user.

At step 626, the knowledge base 218 may be updated. The deployer module 212 may update the knowledge base 218 with the issues, resolution, and deployment steps during each phase. The knowledge base 218 may use this information to provide recommendations for future deployment issues.

Figure 7:
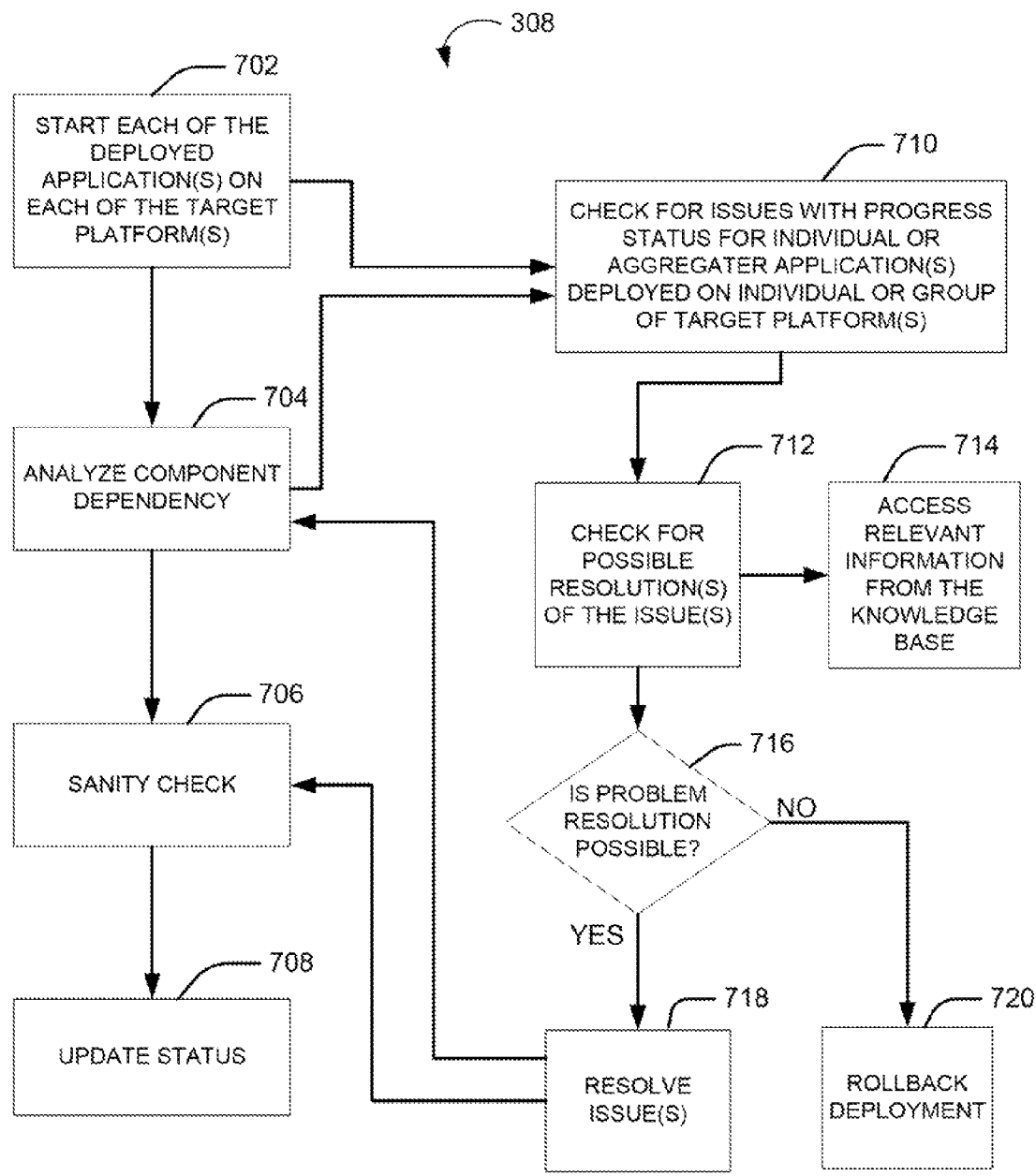
FIG. 7 is a flowchart illustrating exemplary steps in an exemplary post-deployment assessment stage of the deployment process of FIG. 3.

FIG. 7 is a flowchart illustrating various steps that may occur during the post-deployment assessment process 308 of FIG. 3. At step 702, each deployed application on each target platform 104 may be started as discussed with reference to FIG. 1 and FIG. 2. Exemplarily, the deployer module 212 may start the deployed application(s) on each target platform 104 using the admin module 208. The monitoring module 202 may monitor the state of the application and update the deployer module 212 once the application starts. If the deployed application(s) instances cannot be started on each target platform 104, steps 710-720 (described later) may be executed for possible issue resolution and rollback of the deployment.

At step 704, component dependency may be analyzed. Exemplarily, the deployer module 212 may analyze the deployed application's component dependency by obtaining the configuration information from the configuration module 210 and the knowledge base 218. In case of application dependency failing to perform as expected, including dependencies between applications in case of group of applications or applications deployed on different target platforms 104, the steps 710 to 720 may be executed for possible issue resolution and rollback of the deployment.

At step 706, a sanity check may be performed. Exemplarily, the deployer module 212 may obtain the details of the automated sanity tests from the configuration module 210, and the deployer module 212 may execute the automated sanity tests on each newly deployed application in each target platform 104. The monitoring module 202 may monitor the progress of the sanity test execution. In case of a sanity check failing to perform as expected, steps 710-720 (described later) may be executed for possible issue resolution and rollback of the deployment.

Once the sanity test executions are completed successfully, the monitoring module 202 may intimate the deployer module 212 in step 708. The deployer module 212 may update the status of the post-deployment sanity tests to the analytics engine 216 and the knowledge base 218. This in turn updates the database of the knowledge base 218 on the application dependency and sanity check issues and resolutions.

At step 710, issues with progress status are checked for individual or aggregated application(s) deployed on individual or group(s) of target platform(s). Exemplarily, the monitoring module 202 may notify the deployer module 212 regarding issues that may have occurred during any of the above steps like. The monitoring module 202 may also contact the knowledge base 218 for possible recommendation of issues.

At step 712, possible resolution(s) of the issue(s) may be checked. The deployer module 212 may contact the knowledge base 218 in step 714 for remedy recommendations for the issues identified during step 710 on each target platform 104. In case there is no recommendation for an issue, execution may transfer to step 720 for performing a rollback operation.

At step 716, it is determined whether a resolution for an identified problem may be possible. For example, based on recommendations of the knowledge base 218, the deployer module 212 determines whether the encountered issues can be resolved or not on each target platform 104. In case some of the issues could not be resolved, execution may transfer to step 720 for performing a rollback operation.

At step 718, the issues may be resolved. For example, based on the resolution obtained from the knowledge base 218, the deployer module 212 may resolve the issues by contacting appropriate module and processes operation required to resolve the issue and execution may transfer to any of steps 702 to 706 from where the issue had occurred.

At step 720, a rollback operation may be deployed. The deployer module 212 may roll-back the deployment when there are no recommendations for the issues encountered during application dependency check or sanity check. The deployer module 212 may determine, based on the configuration from the configuration module 210, which type of roll-back should be performed (e.g., per application per platform, group of applications per platform, per application from group of platforms, group of applications from group of platforms).

Figure 8:
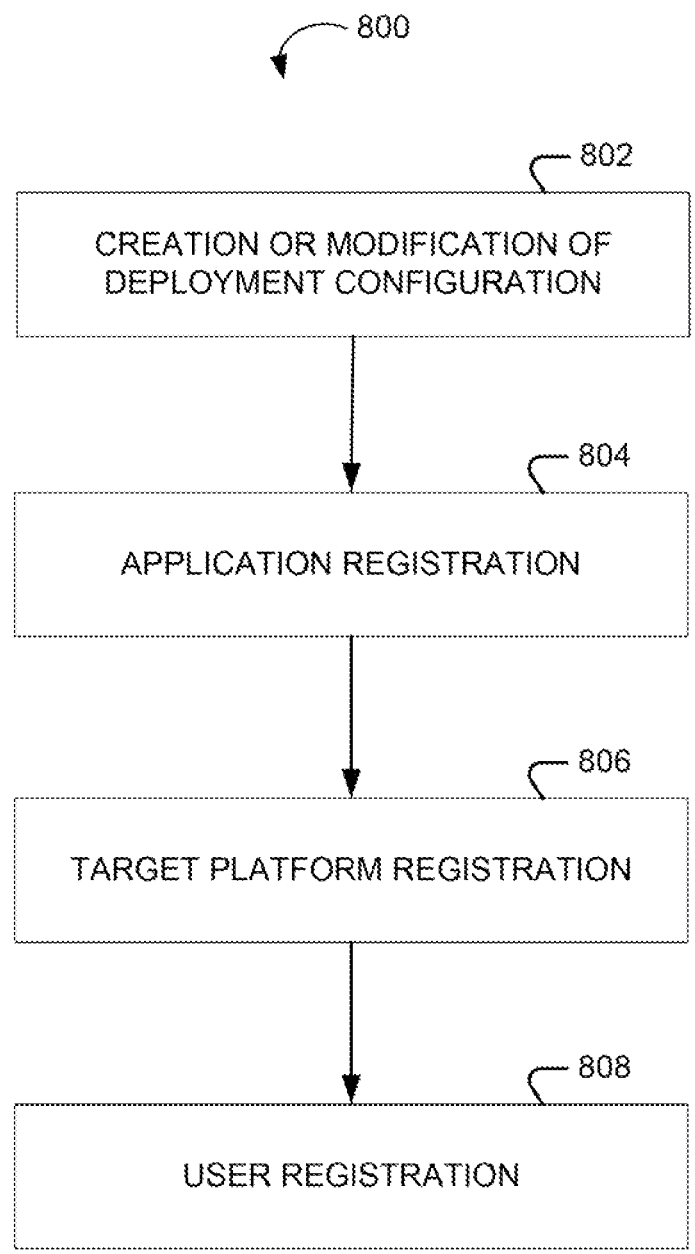
FIG. 8 is a flowchart illustrating exemplary steps in a configuration management process.

FIG. 8 is a flowchart illustrating various steps of an exemplary configuration management process 800. The configuration management process 800 may include creation or modification of deployment configuration in step 802, application registration in step 804, target platform registration in step 806, and user registration in step 808.

The creation or modification of deployment configuration 802 may be performed by using one or more modules as discussed with reference to FIG. 2. The UI module 206 may provide the sign-in screen to the user to enter user credentials. The admin module 208 may then get the user provided credentials authenticated by the security module 220. Next, the admin module 208 may provide the signed-in user options through the UI module 206, to create a new deployment configuration and/or modify an existing deployment configuration and/or modify common configuration parameters for the user (e.g., the user preferences). In case of modification of an existing deployment-configuration or common-configuration, the admin module 208 may display the existing configuration parameters to the user through the UI module 206 for the user to modify one or more parameter values and save the configuration values into the configuration module 210 and the knowledge base 218 as appropriate. In case of a new deployment-configuration or common configuration, the admin module 208 may obtain all default configuration values and existing user preferences from the configuration module 210 and the knowledge base 218. Next, the admin module 208 may display the same to the user via the dashboard. The user may then provide new values to the configuration parameters and modify default values as appropriate and save the configuration. The admin module 208 may save the new configuration into the configuration module 210 and the knowledge base 218 as appropriate.

The application registration 804 may be also performed in various steps using different modules. The UI module 206 may provide the sign-in screen to user to enter user credentials. The admin module 208 may get the user provided credentials authenticated by the security module 220. Next, the admin module 208 may provide options to the user to register a new application or to modify or remove an existing application registration. Similarly, the admin module 208 may provide options to the user to register a source platform 102 or to modify or remove an existing source platform registration.

If an existing application registration is removed, the user may have the option to select one or more registered applications from the list provided by the admin module 208 and confirm the delete option. The admin module 208 may then remove the user selected application registration information from the current configuration. In case of removal of an existing source platform, the user may have the option to select one or more registered source platforms from the list provided by the admin module 208 and confirm the delete option. The admin module 208 may then remove the user selected source platform information (along with the applications related to that source platform) from the current configuration. In case the user selects an existing application configuration to modify, the admin module 208 may first fetch the necessary available configurations from the configuration module 210 and display the same to the user through the UI module 206.

Upon modification of one or more configuration parameters by the user, the admin module 208 may save the modified configuration into the configuration module 210 and the knowledge base 218 as appropriate. In case of a new application registration, the admin module 208 may fetch initial default configuration information along with the existing user preference values from the configuration module 210 and the security module 220 and display a new application registration screen to the user through the UI module 206. The user may provide appropriate values of the configuration parameters related to the source platforms 102 and applications and modify one or more existing values of parameters. The complete registration information may be saved by the admin module 208 in the configuration module 210 and the security module 220 as appropriate.

The target platform registration 806 may be performed by using one or more modules of the deployment tool 108 as follows. The UI module 206 may provide the sign-in screen to user to enter user credentials. The admin module 208 may get the user provided credentials authenticated by the security module 220. The admin module 208 may provide options to the user to register a new target platform or to modify or remove an existing target platform. In case of removal of an existing target platform, the user may have the option to select one or more registered target platform(s) from the list provided by the admin module 208 and confirm the delete option. The admin module 208 may then remove the user selected target platform information from the current configuration. In case the user selects an existing target platform configuration to modify, the admin module 208 may first fetch some or all of the necessary available configuration from the configuration module 210 and display the same to the user through user interface module 206. On modification of one or more configuration parameters by the user, the admin module 208 may save the modified configuration into the configuration module 210 and the knowledge base 218 as appropriate. In case of a new target platform, the admin module 208 may fetch the initial default configuration information along with the existing user preference values from the configuration module 210 and the security module 220 and display a new target platform registration screen to the user through the user interface module 206. The user may provide appropriate values of the configuration parameters related to the target platforms and modify one or more existing values of parameters; the complete registration information may be saved by the admin module 208 in the configuration module 210 and the security module 220 as appropriate.

The user registration 808 may be performed by using one or more modules of the software deployment tool 108 as follows. The UI module 206 may provide the sign-in screen to an administrator to enter their credentials. The admin module 208 may provide options to the administrator to register a new user or to modify or remove an existing user. In case of removal of an existing user, the administrator may have the option to select one or more registered users from the list provided by the admin module 208 and confirm the delete option. The admin module 208 may then remove the selected user registration information from the current configuration. In case the administrator selects an existing user to modify, the admin module 208 may first fetch the necessary available configuration from the knowledge base 218 and display the same to the administrator through the UI module 206. On modification of one or more configuration parameters by the administrator, the admin module 208 may save the modified configuration into the repository of the knowledge base 218. In case of a new user registration, the admin module 208 may display a new user registration screen to the administrator through the UI module 206. The administrator may provide appropriate values of the configuration parameters related to the user; the complete registration information may be saved by the admin module 208 into the repository of the knowledge base 218.

Exemplary embodiments of the present disclosure may be used in any cloud based network. In addition, at least certain aspects of the aforementioned embodiments may be combined with other aspects of the embodiments, or removed, without departing from the scope of the disclosure.

Other embodiments of the present disclosure will be apparent to those skilled in the art from consideration of the specification and practice of the embodiments disclosed herein. It is intended that the specification and examples be considered as exemplary only, with a true scope and spirit of the disclosure being indicated by the following claims.

What is claimed is:

1. An interconnected software deployment system, comprising:
   at least one source platform for obtaining at least one software application;
   at least one target platform in at least one cloud environment, the at least one software application to be deployed on the at least one target platform; and
   a hardware processor configured to execute stored processor-executable instructions to provide a software deployment tool the processor-executable instructions including:
      an integration module configured to communicate with the at least one source platform and the at least one target platform;
      a deployer module configured to implement a deployment process through the integration module, the deployment process including:
         obtaining configuration data on interdependency between the at least one target platform and the at least one software application,
         checking readiness of the source platform for initiating deployment of the at least one software application,
         checking readiness of the target platform for initiating deployment of the at least one software application,
         performing a selective deployment of the at least one software application after the readiness check, and
         performing a post-deployment assessment of the selectively deployed at least one software application after the deployment, wherein the post-deployment assessment includes checking a status parameter of the selectively deployed at least one software application; and a monitoring module configured to monitor the at least one source platform, the at least one target platform, an application status of the at least one software application on the at least one target platform, and the deployment process implemented by the deployer module;

wherein the at least one target platform is assigned either a critical or optional priority, and the deployer module decides whether to rollback the selectively deployed at least one software application based on whether deployment problems occurred with respect to a critical or optional priority target platform.

2. The system of claim 1, wherein the software deployment tool further includes a knowledge base configured to store information on previous deployments, the knowledge base further configured to store information on the interdependency between the software applications, and information on interdependency between resources on the at least one target platform.

3. The system of claim 2, wherein:
the knowledge base is further configured to store resolution information for issues that occurred in previous deployments by the deployer module; and
the deployer module is further configured to:
  consult the resolution information in response to encountering a problem with the deployment at least one software application, and
  decide whether to rollback one or more of the selectively deployed at least one software application based on an outcome of the obtaining configuration data and deployment, and the resolution information from the knowledge base.

4. The system of claim 1, wherein the monitoring module is communicatively coupled to a dashboard for providing deployment status information to a user.

5. The system of claim 1, wherein checking the readiness of the at least one source platform comprises at least one of:
checking availability of the at least one source platform, and
checking availability of the at least one software application on the at least one source platform and availability of resources in the at least one source platform.

6. The system of claim 1, wherein checking the readiness of the at least one target platform comprises at least one of:
checking availability of the at least one target platform by checking dependency between target platforms based on the obtained configuration data, and
checking existence of resources and run-time environments for running the at least one software application on the at least one target platform.

7. The system of claim 1, wherein the at least one cloud environment is a platform-as-a-service cloud environment.

8. The system of claim 1, wherein obtaining the configuration data further comprises obtaining a deployment mode and user preferences, wherein the user preferences include a selection for number of retries required in case of deployment failure.

9. The system of claim 1, wherein the selective deployment is initiated in response to an outcome of the readiness check and obtaining configuration data.

10. A method of deploying at least one software application from at least one source platform to at least one target platform, the method comprising:

obtaining configuration data on interdependency between the at least one target platform and the at least one software application;
checking a readiness of the at least one source platform for initiating deployment of the at least one software application;
checking a readiness of the at least one target platform for initiating deployment of the at least one software application;
performing a selective deployment of the at least one software application after the readiness check; and
performing a post-deployment assessment of the selectively deployed at least one software application after the selective deployment, wherein the post-deployment assessment includes checking a status parameter of the selectively deployed at least one software application;
wherein:
checking readiness of the at least one source platform includes:
  checking availability of the at least one source platform, and
  checking availability of the at least one software application on the at least one source platform and availability of resources in the at least one source platform; and
checking readiness of the at least one target platform comprises at least one of:
  checking availability of the at least one target platform by checking dependency between target platforms based on the obtained configuration data, and
  checking existence of resources and run-time environments for running the at least one software application on the at least one target platform.

11. The method of claim 10, wherein the obtaining configuration data includes:
obtaining configuration data based on user inputs;
obtaining baseline configuration data from a configuration manager; and
obtaining advanced configuration data from a knowledge base which stores configuration data for previous deployments.

12. The method of claim 10, wherein the selective deployment includes simultaneously deploying the at least one software application on the at least one to get platform, and the selective deployment further includes at least one of:
automatically switching between a hot and cold deployment mode based on the at least one target platform;
assessing problems in the deployment of the selective at least one software application;
determining a resolution to the problems by referring to a knowledge base which stores configuration data for previous deployments;
attempting to re-deploy the at least one software application affected by the problems in case of a partial deployment failure; and
reporting instantaneous and cumulative progress status on the selective deployment.

13. The method of claim 10, wherein the post-deployment assessment includes at least one of:
conducting a sanity check of the selectively deployed at least one software application;
performing a behavioral assessment of the selectively deployed at least one software application;
conducting an aggregated and individual status check of the selectively deployed at least one software application; and determining a resolution to encountered problems by referring to a knowledge base which stores post-deployment assessment data for previous deployments.

14. A method of deploying a plurality of software applications to one or more remote environments, the method comprising:
   determining whether resources required for simultaneous deployment of the plurality of software applications are available; and
   selectively deploying the plurality of software applications on the one or more remote environments based on the determination,
   wherein the determining includes checking for interdependency between the plurality of software applications,
   wherein the software applications are enterprise applications and the remote environments are cloud environments, and
   wherein a first subset of the plurality of enterprise applications is deployed on the one or more cloud environments in response to determining that the resources required for simultaneous deployment of all the plurality of enterprise applications are unavailable.

15. The method of claim 14, wherein the determining further includes checking the availability of one or more target platforms in the one or more cloud environments for deployment of the plurality of enterprise applications.

16. The method of claim 14, further comprising:
   performing a post-deployment assessment of the selectively deployed enterprise applications;
   detecting, as a result of the post-deployment assessment, an unsuccessful deployment of one or more of the selectively deployed enterprise applications; and
   initiating a rollback of one or more of the selectively deployed enterprise applications in response to the detecting.

17. The method of claim 14, wherein the one or more cloud environments are platform-as-a-service cloud environments.

18. The method of claim 14, wherein the plurality of enterprise applications are Java applications.

19. The method of claim 16, wherein detecting an unsuccessful deployment includes detecting that one or more of the selectively deployed enterprise applications fails to start.

20. A software deployment system comprising:
   a hardware processor; and
   a memory configured to store instructions executable by the hardware processor, the hardware processor configured by the instructions to:
      determine whether resources required for simultaneous deployment of the plurality of software applications are available; and
      selectively deploy the plurality of software applications on the one or more remote environments based on the determination,
      wherein the determining includes checking for interdependency between the plurality of software applications,
      wherein the software applications are enterprise applications and the remote environments are cloud environments, and
      wherein the hardware processor is further configured to deploy a first subset of the plurality of enterprise applications on the one or more cloud environments in response to determining that the resources required for simultaneous deployment of all the plurality of enterprise applications are unavailable.

21. The system of claim 20, wherein the determining further includes checking the availability of one or more target platforms in the one or more cloud environments for deployment of the plurality of enterprise applications.

22. The system of claim 20, wherein the hardware processor is further configured to:
   perform a post-deployment assessment of the selectively deployed enterprise applications;
   detect, as a result of the post-deployment assessment, an unsuccessful deployment of one or more of the selectively deployed enterprise applications; and
   initiate a rollback of one or more of the selectively deployed enterprise applications in response to the detecting.

* * * * *

UNITED STATES PATENT AND TRADEMARK OFFICE
CERTIFICATE OF CORRECTION

PATENT NO. : 8,997,088 B2
APPLICATION NO. : 13/755042
DATED : March 31, 2015
INVENTOR(S) : Nagesh Nagaraj Gurikar et al.

It is certified that error appears in the above-identified patent and that said Letters Patent is hereby corrected as shown below:

In the Claims

Claim 1, Col. 22, Line 47, "tool the" should read as --tool, the--.

Claim 12, Col. 24, Line 45, "to get" should read as --target--.

Signed and Sealed this
Twenty-sixth Day of January, 2016

Michelle K. Lee
*Director of the United States Patent and Trademark Office*